United States Patent [19]

Carballo

[11] Patent Number: 4,751,832

[45] Date of Patent: Jun. 21, 1988

[54] ANTITHEFT DEVICE TO BLOCK THE PASSAGE OF FUEL

[76] Inventor: Jose D. Carballo, Barrera, 11 32005-Orense, Spain

[21] Appl. No.: 914,309

[22] Filed: Oct. 2, 1986

[30] Foreign Application Priority Data

Apr. 23, 1986 [ES] Spain .................................. 293.771

[51] Int. Cl.⁴ ............................................ E05B 65/12
[52] U.S. Cl. ...................................... 70/242; 70/361
[58] Field of Search ................ 70/242, 360, 175, 243, 70/361; 137/528, 384.2, 384.6; 251/326, 357

[56] References Cited

U.S. PATENT DOCUMENTS

| 3,071,958 | 1/1963 | Russo | 70/361 |
| 4,131,127 | 12/1978 | Ferro | 70/242 |
| 4,550,896 | 11/1985 | Hansen | 251/357 |

Primary Examiner—Robert L. Wolfe
Attorney, Agent, or Firm—Robbins & Laramie

[57] ABSTRACT

The invention is directed to an antitheft device for blocking the passage of fluid in a supply line. Inlet and outlet chambers are coupled in line with the supply. A distribution chamber in flow communication with the inlet and outlet chambers through a passage has a piston movable from an open to a closed position for likewise opening and closing the device. An internal latch operated by means of a key actuates the piston for opening and closing the supply line.

16 Claims, 7 Drawing Sheets

ANTITHEFT DEVICE TO BLOCK THE PASSAGE OF FUEL

BACKGROUND OF THE INVENTION

The subject of this invention is an antitheft device to block the passage of a fluid through a supply pipe, to be used especially as an antitheft device for motor-driven vehicles which blocks the passage of fuel between the fuel tank and the motor of the vehicle. The novel features of this invention enable it to contribute the following advantages to what is already known. These advantages are capable of being put to industrial use.

(a) If it is sought to assure the blocking of the fuel of a vehicle as protection against theft or robbery, the device can be installed in a spot which is easily hidden and the device can be operated by means of an unobtrusive maneuver, preferably by using the foot.

(b) If it is applied to a vehicle which still has fuel in the engine valve duct it does not immediately block the operation of the motor, thus allowing the assailants to drive several hundred meters, reducing in this way the risk of personal harm in a robbery.

(c) A key is needed to unblock the device, which means that if the motor stops running and the device is discovered the car cannot be restarted without the key.

(d) If an attempt is made to force the device, then the connection between the device and the motor would be broken, causing the vehicle to become completely inoperable, unless complicated mechanical adjustments are made, which would require a long period of time and which would not facilitate the perpetration of the theft.

(e) The device is easy to install for a mechanical workshop or if one has a few appropriate tools.

(f) Since it is hidden from view, it has no adverse effect upon the esthetics of the vehicle.

(g) It can be applied to any type of fluid supply line the passage through which it is sought to control, either for the purpose of providing exclusive access to a single person authorized to handle certain fluids or if such fluids are in short supply or are very expensive.

SUMMARY OF THE INVENTION

According to the invention, the antitheft device acting to block the passage of fluid is composed basically of a rigid structure formed by two semi-bodies that can be connected to one another, one of which has two sockets or chambers intended for receiving the two extremities of the supply line, both chambers being joined by a distribution chamber through a gap in the bottom of a cylindrical tubular projection which emerges from the bottom of the semi-body and wherein is housed, in an axially displaceable manner, a piston which is provided with toric joints, so that it can open or close the passage between both chambers, the piston being operated by means of an internal latch which can move axially from a closed position, in which a pivot fits into a groove of its guide, to an open position, when said pivot is withdrawn by the action of the key, to which it is driven by a spring. Both the guide and the latch are housed in the other semi-body.

In particular, this device can be used in blocking the gasoline in vehicles, as an antitheft security valve, and to achieve this purpose the device is connected in the supply line which goes from the fuel tank to the carburetor.

BRIEF DESCRIPTION OF THE DRAWINGS

For the purpose of facilitating the description of the device, and by way of example and consequently without limiting the description in any way, the accompanying drawings represent a characteristic design of the present invention. In the drawings.

DESCRIPTION OF THE PREFERRED EMBODIMENT

Figure 1:
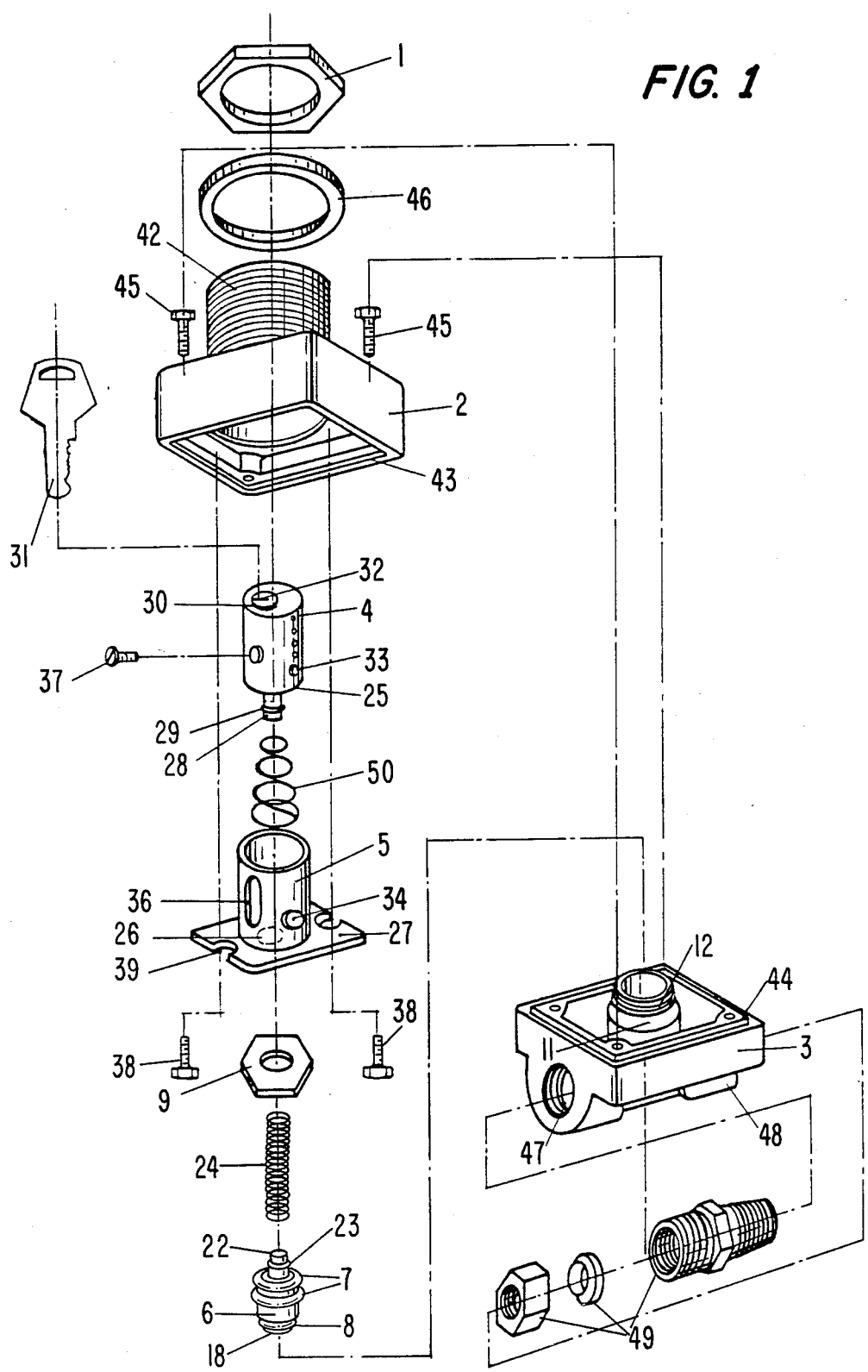
FIG. 1 shows all of the parts of the device in accordance with the invention presented separately in perspective.
Figure 2:
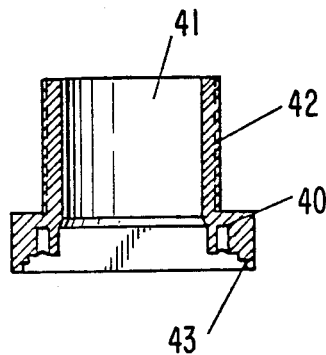
FIGS. 2, 3 and 4 show respectively, a side view in axial section, a bottom view of the lower part, and a view from the top of the main upper main semi-body.
Figure 3:
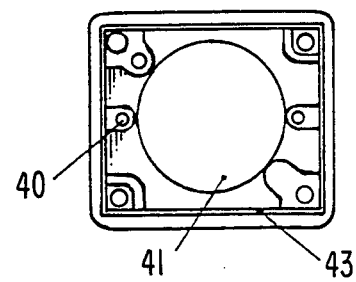
Figure 4:
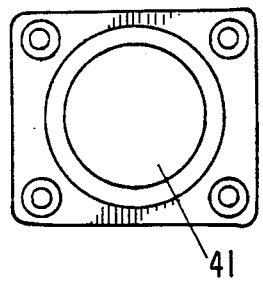
Figure 5:
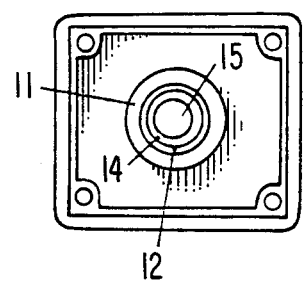
FIGS. 5, 6, 7 and 8 show, respectively, a view from the top, a bottom view of the lower part, a side section and a front view of the lower main semi-body.
Figure 6:
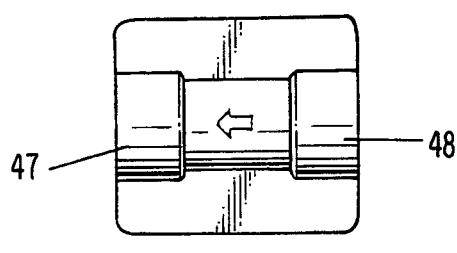
Figure 7:
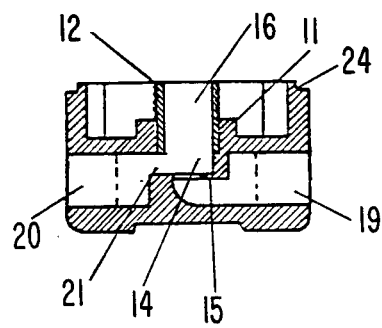
Figure 8:
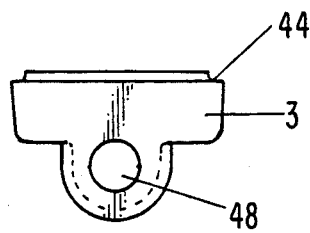
Figure 9:
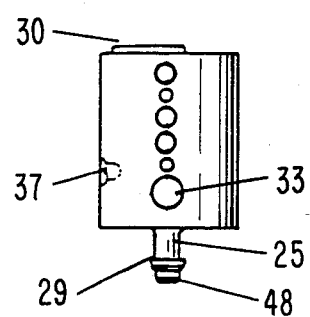
FIG. 9 shows a side view of the internal cylinder or latch which is operated by the key.
Figure 10:
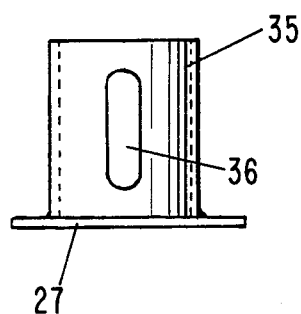
FIGS. 10, 11 and 12 show, respectively, views from the side, from the front and from the bottom of the guide of the latch.
Figure 11:
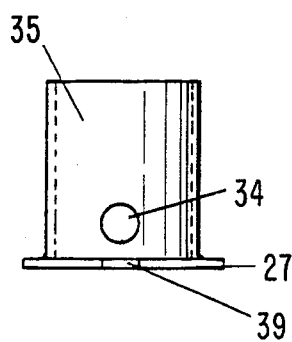
Figure 12:
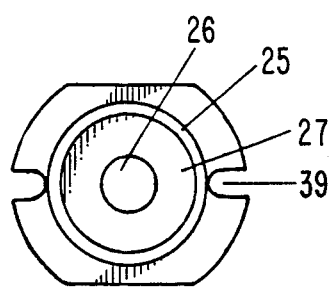
Figure 13:
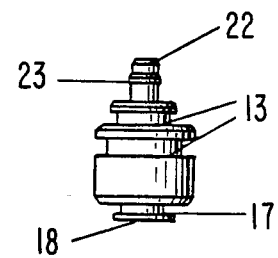
FIG. 13 shows a side view of the closing piston.
Figure 14:
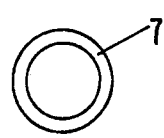
FIGS. 14, 15, 16, 17, 18 and 19 show views of the toric joints.
Figure 16:
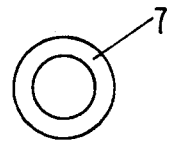
Figure 15:
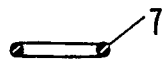
Figure 17:
Figure 18:
Figure 20:
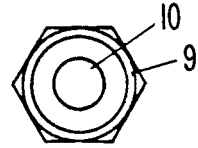
FIGS. 20 and 21 show, respectively, a top and axial section of the nut which is designed to limit the movement of the piston.
Figure 19:
Figure 21:
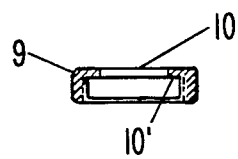
Figure 22:
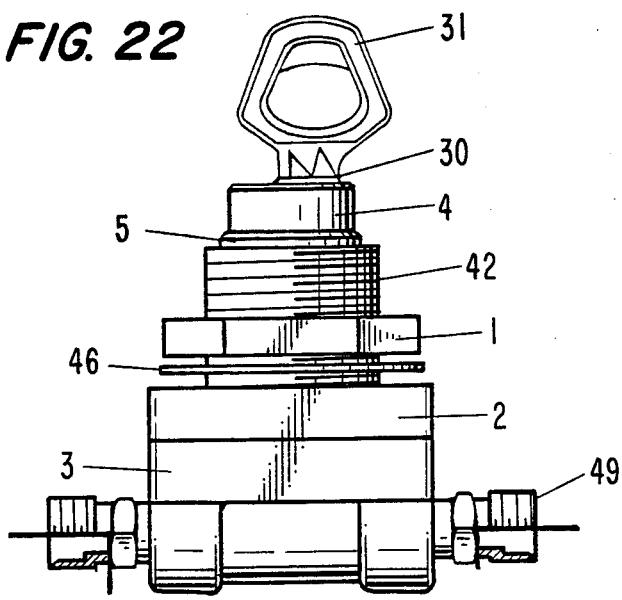
FIGS. 22 and 23 show the antitheft device, in a side elevation view, in its open and closed positions, respectively.
Figure 23:
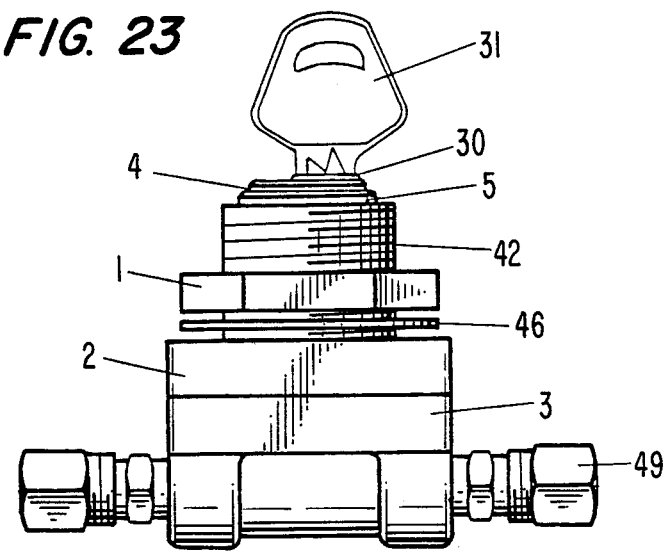
Figure 24:
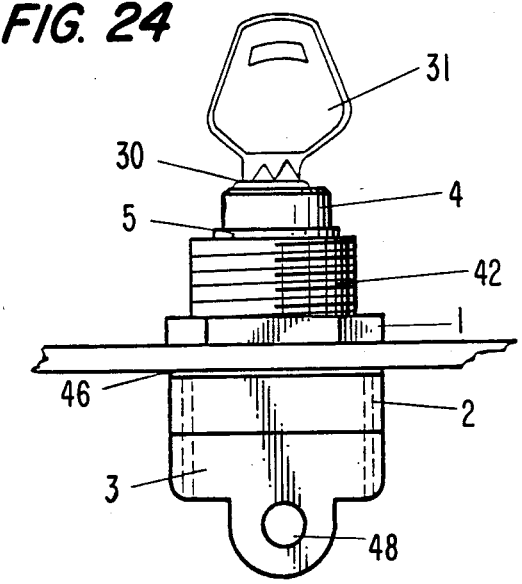
FIG. 24 shows a front view of the antitheft device.
Figure 25:
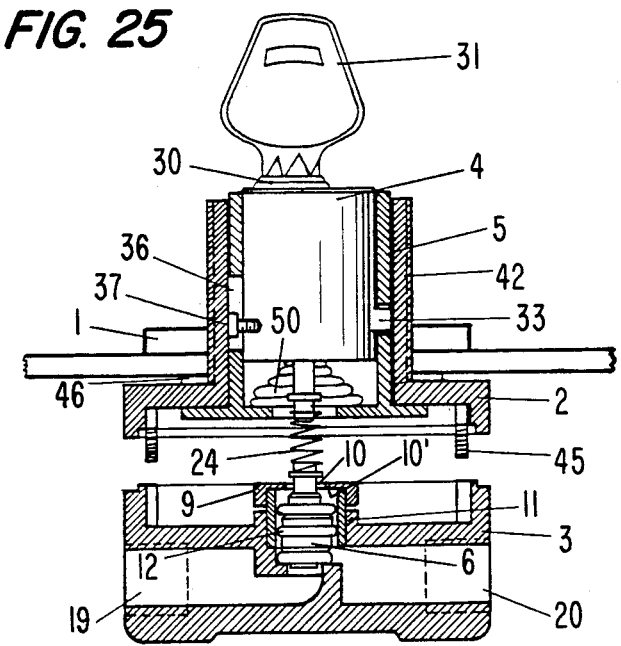
FIG. 25 shows an axial section of the antitheft device.

With regard to the drawings, it may be noted that the device is composed of a rigid structure formed basically of two main pieces or semi-bodies 2 and 3, inside of which the elements acting as a lock are housed. The structure is attached to the plate of the vehicle (not shown) by means of an appropriate nut 1.

The lower main semi-body 3 is composed of a guard from the center of which there protrudes internally a hollow cylinder 11. Housed in this cylinder is a cylindrical sleeve horn portion or 12 threaded in its upper part which accepts a hexagonal nut which is also threaded 9 with a central hole 10 through which the spring 24 passes. This hexagonal nut is threaded to the horn when the closing piston 6 is situated inside of this hollow horn 12. This piston is cylindrical in shape with two side grooves 13 into which fit two toric joints 7 which impart fluid tightness to the system, preventing the fuel from passing from the distribution chamber 14 of the lower main semi-body 3 to the rest of the mechanism. The bottom 15 of the cylindrical hole 16 is conical in shape and against it rests the toric joint 8 which fits into a groove 17 of a projection 18 located in the lower part of the piston 6.

The toric joint 8, situated in the lower projection 18 of the piston 6, rests against the conical surface 15 of the bottom of the cylinder, preventing, on account of its mechanical position, the fluid from passing from the entry chamber 19 to the exit chamber 20.

The piston 6 moves rectilinearly between a lower position shown in FIG. 1 and an upper position for allowing passage of fuel or liquid through opening 21 between the inlet chamber 20 and the exit chamber 19.

If the piston 6 is allowed to be raised to the fuel passage position, then the fuel will pass from the entry chamber 19 to the distribution chamber 14 and from that chamber it will pass, through an opening 21 in the shape of a half moon, to the exit chamber 20, thus allowing fuel to be fed to the motor.

The piston 6 has a projection 22 on its upper side with a central rugosity 23 to make it possible to firmly secure a spring 24 which, when it is pushed downward by the internal latch, presses the toric joint 8 onto the conical surface 15 of the bottom of the distribution chamber 14, thus preventing the fuel from passing to the exit chamber 20 through the hole in the shape of a half moon 21.

The threaded nut 9, which fits over an upper portion of the cylindrical member 12 has an aperture 10 therein which is smaller than the threaded portion, thereby providing a radially projecting portion or shoulder 10'. The shoulder 10' is adapted to engage an upper one of the toric joints 7 to seal the chamber against leakage when the piston 16 is withdrawn away from the opening 21 between the inlet chamber 20 and the exit chamber 19.

The lower part of the internal latch 4 which is fitted inside of the guide of the latch 5 has a cylindrical projection 25 which serves the purpose of fitting into a hole 26 of the base 27 of the guide of the latch 5. The cylindrical projection 25 of the latch 4 extends into another cylindrical projection 28, with an intermediate extension 29 into which the other extremity of the spring 24 fits.

The internal latch 4 has a cylinder 30 which rotates by means of a key 31 which is inserted into the resulting groove 32. It has a side pivot 33 which withdraws when the key is activated 31. This side pivot or bolt 33 fits into an opening 34 situated in the side of the guide of the latch 5.

The guide of the latch 5 is composed primarily of a tubular body 35 the bottom of which is covered by a base plate 27 which fits inside of the upper main semi-body 2. At the bottom of the base 27 and centered there is a hole 26 to establish and secure the centering of the internal latch 4.

The guide of the latch 5 has a hole in its side to fit into the bolt 33 of the internal latch and it has another elongated hole 36 which allows the internal latch to move parallel to the common axis of the guide and of the latch, limiting its movement by means of the screw 37 attached to the latch 4.

The guide of the latch 5 is attached to the upper main semi-body 2 by means of some holes 39, in the edges of the base 27 of the guide of the latch, and are attached by screws 38 into some threaded holes 40 of the upper semi-body 2.

Inside of the guide of the latch 5 there is a spring which is shaped in the form of a truncated cone 50 which makes it possible to recede the latch 4 to its open position when the key 31 is activated.

The upper semi-body has a cylindrical internal surface 41 through which the latch and its guide are fitted and which is threaded externally 42 to allow the nut to be attached to the vehicle which is to be protected.

There are some grooves 43 and 44 in both of the main semi-bodies which fit the two semi-bodies together, thus achieving the necessary fluid tightness, which can be increased by adding some joint or seal. The two semi-bodies are fastened together by means of screws 45 which are threaded into the lower semi-body 3.

Lastly, to achieve fluid tightness with the vehicle (not shown), a joint or seal 46 can be added between the upper semi-body and the nut 1.

The device is connected to the fuel system of the vehicle by cutting the fuel supply line (not shown), connecting both extremities of the piping to the openings 47 and 48 situated on opposite sides of the lower main semi-body, thus making both sides of the fuel supply line be connected to the entry opening 19 and the exit opening 20 of the lower main semi-body. This connection can be achieved by means of a set of nuts and threads 49, as appropriate.

This model can be made in any appropriate sizes and materials and can be subject to all kinds of detail modifications provided that they do not alter its basic function.

The nature of the invention having been sufficiently described as well as the way it can be carried out in actual practice, it must be pointed out that the aforementioned arrangements can be subject to all kinds of detail modifications provided that they do not alter the basic principle.

What is claimed is:

1. An antitheft device for blocking the passage of fluid through a supply line comprising a rigid structure formed of two semi-bodies adapted to be connected one to the other, one semi-body has respective inlet and outlet chambers adapted to be coupled in flow communication with the supply line and a cylindrical tubular portion in the semi-body extending interiorly thereof forming a distribution chamber having a passage in flow communication between the inlet and outlet chambers, a piston axially displaceable rectilinearly within the cylindrical tubular portion said piston including toric joints engaging the cylindrical tubular portion for opening and closing the passage between the inlet and outlet chambers, said piston being cylindrical and having circular side grooves perpendicular to the axis of the tubular cylindrical portion, and wherein the toric joints are housed within the grooves to provide fluid tightness with the cylindrical tubular portion and means secured to the cylindrical tubular portion for securing the piston therein and for providing a seal with at least one of said toric joints for sealing the piston when the passage is open to thereby prevent overflowing of the distribution chamber, and a guide and latch means housed in the other semi-body, said latch means being rectilinearly movable in the guide axially from a closed position to an open position, the piston being operatively coupled to the latch for opening and closing the passage in response to the position of the latch.

2. A device according to claim 1 wherein the piston is cylindrical and has circular side grooves perpendicular to the axis of the cylinder, and wherein the toric joints are housed within the grooves to provide fluid tightness to thereby prevent overflowing of the distribution chamber, and wherein the bottom of the cylindrical tubular portion has a conical shape.

3. A device according to claim 2 wherein the piston has a lower projection and a toric joint situated in the lower projection rests against the conical surface of the bottom of the cylindrical tubular portion, and a spring means acting on an upper end of the piston urges the piston against the conical surface to prevent liquid from passing from the entry chamber to the exit chamber.

4. A device in accordance with claim 3 wherein the piston has a projection with a central rugosity in its upper side for receiving an end of the spring means which provides the pressure for closing the piston, the spring means engaging the latch and pressing the toric joint of the lower projection of the piston against the conical surface of the distribution chamber, to thereby cut off the passage of the fluid therethrough.

5. A device in accordance with claim 4 wherein the guide has a centering hole in a lower portion thereof and the latch means fits within the guide and includes a lower projection for centering in the hole within the bottom of the guide, the projection having a distal portion which is thinner than the projection and an intermediate expansion portion for engaging the other end of the spring means which engages the piston.

6. A device in accordance with claim 5 wherein the guide comprises a tubular body having a closed bottom which is adapted to fit within the corresponding semi-body and which is secured therein.

7. A device in accordance with claim 6 wherein the latch means has a fixed radial pin and a retractable radial pin and the guide has a longitudinal opening for receiving the fixed radial pin to thereby permit axial movement of the latch means, and the guide has a circular opening for receiving the retractable radial pin to thereby limit the travel of said latch means when the retractable radial pin is in the circular opening, and to release the latch for axial movement when the retractable radial pin is retracted from the circular opening.

8. A device in accordance with claim 1 wherein the latch means and guide are secured within openings in the corresponding semi-body, an external surface of the semi-body being threaded to accept a fastening nut.

9. A device in accordance with claim 1 wherein the semi-bodies have mating surfaces including grooved portions and joint means for maintaining liquid tightness of the device.

10. A device in accordance with claim 1 including means for coupling the inlet and outlet chambers to the supply line.

11. A device in accordance with claim 1 in which the liquid tightness is about 14 km per square centimeter.

12. A device in accordance with claim 1 in which flow communication from the inlet chamber to the outlet chamber is about 5 liters per minute.

13. A device in accordance with claim 1 wherein the latch includes a key operated means for operating the latch between the open and closed positions.

14. A device in accordance with claim 1 wherein first spring means engaging the piston and the latch means biases the piston to a closed position when the latch means is closed and permits the piston to open when the latch means is open and second spring means concentric and coaxial with the first spring means biases the latch means to an open position.

15. A device in accordance with claim 1 wherein the supply line is a fuel line for an automobile.

16. A device in accordance with claim 1 wherein the means secured to the cylindrical tubular portion for securing the piston therein comprises a threaded nut having a portion extending radially inwardly of the cylindrical portion for providing a shoulder adapted to engage at least one of the toric joints for sealing the passage.

* * * * *